United States Patent [19]

Elleman et al.

[11] Patent Number: 4,846,370
[45] Date of Patent: Jul. 11, 1989

[54] SPHERE BASED FLUID SYSTEMS

[75] Inventors: Daniel D. Elleman, San Marino; Taylor G. Wang, Glendale, both of Calif.

[73] Assignee: California Institute of Technology, Pasadena, Calif.

[21] Appl. No.: 693,773

[22] Filed: Jan. 23, 1985

[51] Int. Cl.⁴ ............................................. B65D 35/28
[52] U.S. Cl. .................................... 222/102; 222/107; 222/94
[58] Field of Search ...................... 222/3, 145, 94, 101, 222/102, 106, 107, 129, 92; 401/151; 206/528, 535

[56] References Cited

U.S. PATENT DOCUMENTS

| | | | |
|---|---|---|---|
| 2,194,882 | 3/1940 | Bamber | 222/102 |
| 3,265,249 | 8/1966 | Jansson | 222/101 |
| 3,371,823 | 3/1968 | Petersen | 222/101 X |
| 3,511,665 | 5/1970 | Simjian | 222/94 X |
| 3,826,580 | 7/1974 | Bohli | 222/94 X |

Primary Examiner—Joseph J. Rolla
Attorney, Agent, or Firm—Frelich Hornbaker Rosen & Fernandez

[57] ABSTRACT

Systems are described for using multiple closely-packed spheres. In one system for passing fluid, a multiplicity of spheres lie within a container, with all of the spheres having the same outside diameter and with the spheres being closely nested in one another to create multiple interstitial passages of a known size and configuration and smooth walls. The container has an inlet and outlet for passing fluid through the interstitial passages formed between the nested spheres. The small interstitial passages can be used to filter out material, especially biological material such as cells in a fluid, where the cells can be easily destroyed if passed across sharp edges. The outer surface of the spheres can contain a material that absorbs a constitutent in the flowing fluid, such as a particular contamination gas, or can contain a catalyst to chemically react the fluid passing therethrough, the use of multiple small spheres assuring a large area of contact of these surfaces of the spheres with the fluid. In a system for storing and releasing a fluid such as hydrogen as a fuel, the spheres can include a hollow shell containing the fluid to be stored, and located within a compressable container that can be compressed to break the shells and release the stored fluid.

7 Claims, 2 Drawing Sheets

SPHERE BASED FLUID SYSTEMS

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

The creation of a flow path containing numerous passageways of closely controlled size and configuration is useful in a variety of applications, including the filtering of particles from a fluid and the contact of a fluid with a particular material which forms the walls of the passages. Recent developments have enabled the production of spherical shells of closely controllable outside diameter and great uniformity, in a wide range of sizes and materials (both on the outside and the inside of the shell). The utilization of such uniform shells to form passages of closely defineable size and shape would aid in the creation of filters and other multi-passage devices.

The above-described shells contain a fluid within the shell walls. This enables difficult-to-store fluids to be kept, provided that they can be dispensed in a controlled fashion when needed. The provision of a dispenser which can dispense fluid from shells would have considerable use.

SUMMARY OF THE INVENTION

In accordance with one embodiment of the present invention, a mass is provided with numerous passages having smooth walls and closely controlled passage sizes and configurations, which can be used to pass fluids therethrough. The mass is formed from a multiplicity of spherical elements, all of the same size, and with the elements closely nested in each other. The nested spherical elements can be used as a sieve or filter which passes a fluid and particles smaller than a predetermined size, but which stops particles that are larger than the predetermined size, with the particles being stopped against smooth walls. The outside surface of the spherical elements and the fluid that passes through the mass of such elements can interract, so that, for example, the surface of the elements can adsorb certain materials in the fluid or can act as a catalyst to cause chemical reactions in the fluid.

In another embodiment of the invention, the spheres are hollow shells of solid material filled with fluid to be stored. The hollow spheres are packed into easily collapsable containers which can be collapsed to crush these spheres and release the fluid lying therewithin. A machine for retrieving the stored fluid can include a pair of jaws and means for advancing the container along its length between the jaws to compress the container and fracture the elements to release the fluid therein.

The novel features of the invention are set forth with particularity in the appended claims. The invention will best be understood from the following description when read in connection with the accompanying drawings.

DESCRIPTION OF THE PREFERRED EMBODIMENTS

Figure 1:
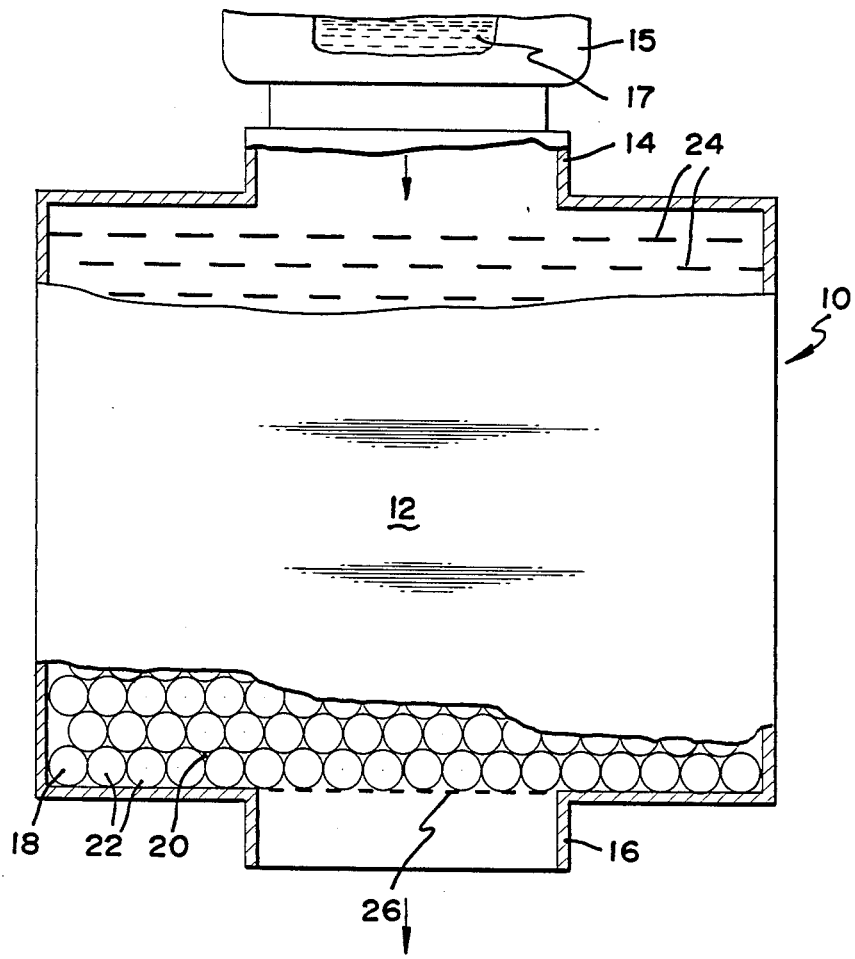
FIG. 1 is a partially sectional and side elevation view of an apparatus constructed in accordance with the present invention.

FIG. 1 illustrates a filter apparatus 10 which includes a housing 12 having an inlet 14 that receives fluid from a source 15, and an outlet 16. The device is used to filter a fluid 17 containing particles that are to be removed from the fluid. The apparatus includes a multiplicity of spherical elements 18 which are all of the same outer diameter and which are closely nested in each other, to form passages 20 between the nesting spheres. The spherical elements are arranged so that all of the fluid which reaches the outlet 16 must pass through the mass 22 that is formed of the multiplicity of spherical elements of the same outside diameter and that are closely nested in one another. A group of distribution screens 24 is placed near the upper end of the housing to help distribute the fluid. A holding screen 26 is placed in the lower portion of the housing to retain the spherical elements.

Figure 2:
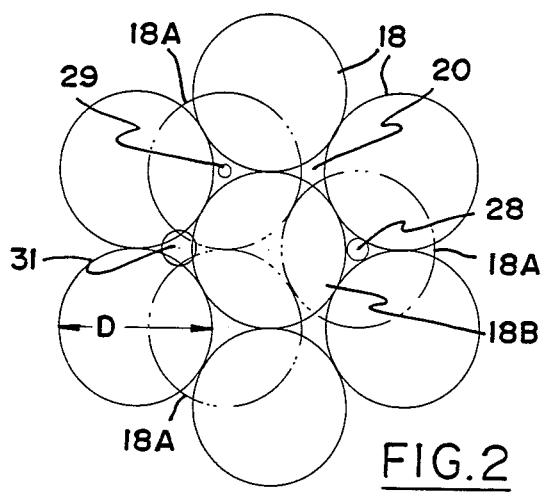
FIG. 2 is a view of a portion of the apparatus of FIG. 1.

FIG. 2 illustrates the configuration of a group of nested spheres or spherical elements of the mass. The spheres are nested in two dimensions, where there are at least seven spheres and most are substantially in contact with at least three others, and at least one is substantially in contact with at least six others. The spheres are in three dimentional nesting where there are at least thirteen spheres (including three spheres 18A on each side of the cluster of seven) so a center sphere 18B substantially contacts twelve other spheres.

It can be seen that the passages 20 between the nested elements 18 are of the same size and configuration, and that the passages have smooth walls, where the surfaces of the spheres are smooth. The passages have narrowest locations that permit the passage of a round object such as indicated at 28, that has a diameter that is only about 14% of the diameter D of each of the spherical elements. The fluid source includes particles 29 of a diameter less than particle 28, that can pass, while particles 31 of a greater diameter are stopped. When used as a sieve, the apparatus is useful as a specialized biomedical filter whose smooth walls avoid damage to the small particles (e.g. cells) in the fluid. The smooth-walled passages also avoid recessed pockets of stagnation. The walls can be made very smooth where the spheres are formed by surface tension of molten material that cools primarily when suspended in a gas or a vacuum. Spheres of a variety of sizes ranging from about 1 milimeter to about 20 microns diameter have been produced, which were of highly uniform sizes. This permits the filtering of very fine particles carried in a fluid (liquid or gaseous). The uniformity of size of the spheres allows for very accurate screening of the filtered material.

In the apparatus of FIG. 1, the screen 26 can have holes only slightly smaller than the spherical elements but much larger than the widths of the passages between the the spherical elements. For example, the holes in the screen can have a width about five times the diameter of the object 28, and a sectional area about twenty-five times greater, without passing the spherical elements 18. If large amounts of particles fill the interstitial passages between the spheres, the filter can be renewed and the particles recovered by placing the particles on a surface where they are spaced apart and washing them with a liquid or gas.

Figure 4:
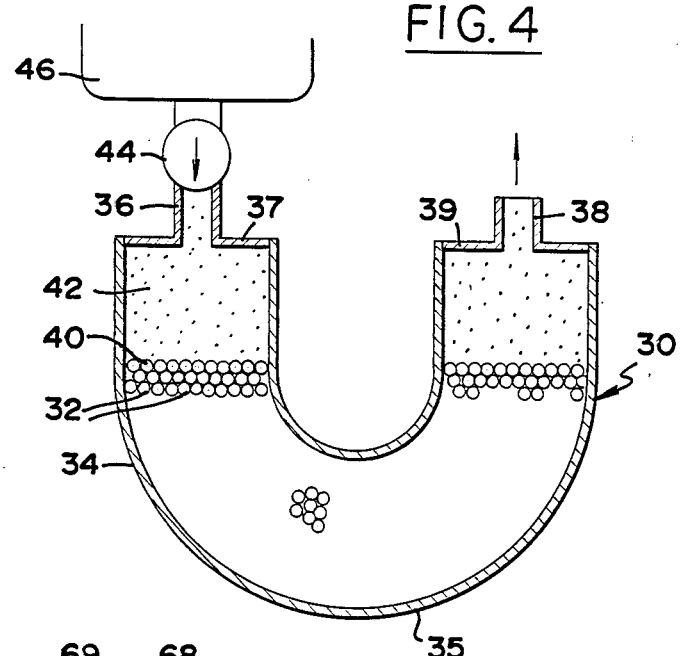
FIG. 4 is a sectional view of a fluid passing apparatus constructed in accordance with another embodiment of the invention.

FIG. 4 illustrates another fluid passing apparatus 30 which is designed to carry a large number of small particles without requiring a screen to hold them in place. The apparatus is especially useful where large area contact is desired between the surfaces of the spheres 32 and the fluid which passes through the passages between these sheres. The apparatus includes a housing 34 having a U shape and with an entrance and exit 36, 38. The spheres can be closely packed by dropping them into the container and by vibrating or shaking the container so that the spheres closely nest in one another under the force of gravity. The lower portion 35 of the container traps the spheres while the inlet and outlet ends 37, 39 of the container can be removed to permit removal of the spheres. The spheres are free of bonding to each other so they can be easily removed.

In one example, the bed 40 of spherical elements is used to interact with the fluid passing therethrough. The spherical elements are coated with palladium which adsorbs hydrogen. Gas 42 containing hydrogen is pumped through the bed of spherical elements to remove any hydrogen contained in the gas. As the gas passes through the bed of spheres, it is divided into numerous convoluted streams between the outside walls of the spheres that gently agitate the gas. The outside walls form a large area for contacting any hydrogen in the gas to adsorb it, to assure that a very high percentage of the hydrogen is removed. The hydrogen can be desorbed by heating the elements until the hydrogen is driven off. In the apparatus 30, a pump 44 pumps the gas from a source 46 into the apparatus 30, while the outlet 38 is connected to further equipment (not shown). The source 46 can deliver a fluid which contains an adsorbable component and/or the fluid can be chemically reacted by a catalyst at the outsides of the spheres.

Figure 3:
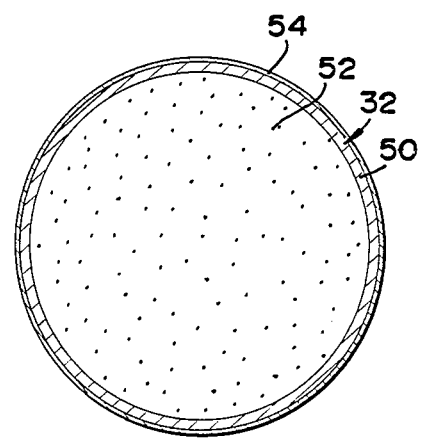
FIG. 3 is a sectional view of a spherical element constructed in accordance with the present invention, and which can be used in the apparatus of FIG. 1.

FIG. 3 illustrates one of the elements 32 which is used to adsorb hydrogen. The element includes a shell 50 of spherical shape, which contains a fluid such as a gas 52. Where the surface of the sphere requires a particular material for interaction with the fluid passing by it, either the shell 50 can be made of such material or a coating shown at 54 can be applied around the shell. U.S. Pat. No. 4,425,376 shows one method for applying such a coating.

The apparatus 30 in FIG. 3 can be used to produce chemical reactions in a fluid passing through the bed of spherical elements. This can be accomplished by using a surface area of the elements, which comprises a catalyst that causes a chemical reaction in the fluid passing across the catalyst. This is especially useful where a slow catalyst is required to cause the desired chemical reaction, and where the large area of contact between the fluid and the surfaces of the shells enables close interaction of the catalyst with the fluid. As in the case of the apparatus of FIG. 1, if residue accumulates in the bed of elements and tends to block its passages, the spherical elements can be removed and washed before being replaced in the apparatus. If such separation is not required, the spherical elements can be bonded to one another as by sintering a mass of such elements.

Figure 5:
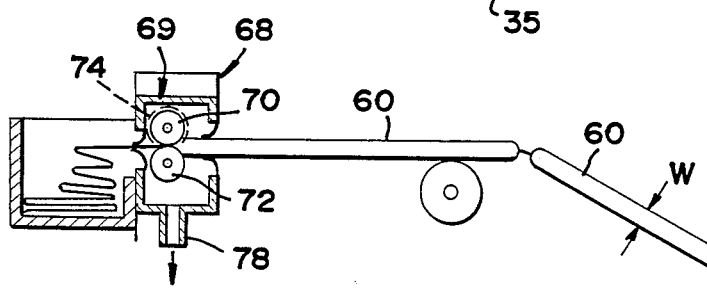
FIG. 5 is a partially sectional and partially side elevation view of a storage and retrieval apparatus constructed in accordance with another embodiment of the invention.
Figure 6:
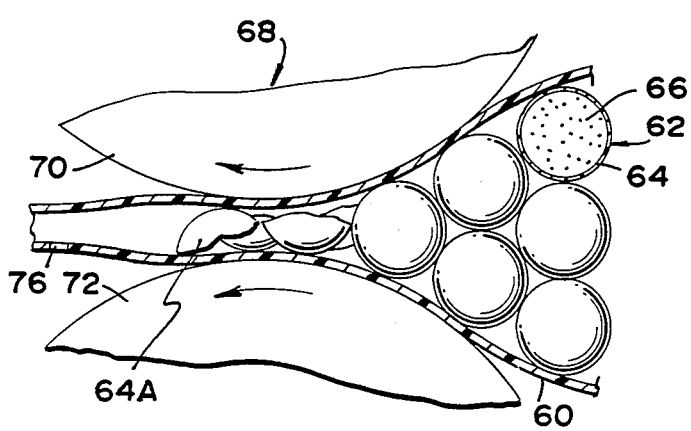
FIG. 6 is a sectional view of a portion of the apparatus of FIG. 5.

FIG. 5 and 6 illustrate an apparatus for storing and receiving stored material that has been stored within spherical shells. As can be seen in FIG. 3, a shell such as 32 can have most of its volume occupied by a stored fluid 52. Thus, a difficult-to-handle material can be more safely stored within multiple shells. This includes gas under high pressures of many atmospheres. The apparatus of FIG. 5 permits the closely-controlled release of the stored material.

The apparatus includes storage containers 60 formed of flexible material such as a vinyl sheet material, that are compressable along their width dimension W. The containers are elongated, with a length L greater than their width W, and are successively connected at their ends by ties 61. A multiplicity of storage elements 62 has a largely spherical shell 64 of an easily fractured material such as glass or a rigid plastic, that surrounds a stored fluid 66. An apparatus 68 for retrieving the stored fluids, includes squeezing and advancing means 69 that comprises a pair of jaws 70, 72 in the form of rollers that are closely spaced, and a motor 74 for turning the roller jaws to advance the container along its length between the jaws to compress the container and fracture the elements. When the shell of an element is fractured as at 64A, the fluid therein is immediately released. The fluid can pass out of the container through small holes 76 therein and out through an outlet 78. The jaws can be slightly separated where all the elements are of the same diameter. As shown in FIG. 6, the jaws can be separated by more than the thickness of the container walls. A difficult-to-handle fluid such as hydrogen gas or a volatile liquid hydrocarbon, can be stored at a high pressure within the spherical shells 64, and whatever amount is needed is easily retrieved. The storage elements can be closely nested as a relatively compact mass within the container so that most of the container volume is filled with the fluid. In one example, storage elements, each of a diameter of one milimeter and a wall thickness of 0.02 milimeteres, store methane under a pressure of ten atmospheres.

Thus, the invention provides systems for utilizing closely nested spherical elements to form uniquely useful masses of such elements. In one apparatus, the nested spherical elements lie in a container having an inlet and outlet. The mass of elements can serve as a sieve or filter with smooth wall passages for passing only particles that are below a certain size. The mass of elements can have surface areas that interact with the fluid passing therethrough, as by adsorbing or desorbing certain constituents or acting as a catalyst for chemical reactions between components of the fluid. The large areas of the convoluted passages, which can be very great where very small spherical elements are used, provides a large area of contact between the surfaces of the elements and the fluid. The largely spherical elements can be filled with a hard-to-store material, and the shells can be crushed to release the stored fluid.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. Apparatus for storing and releasing fluid comprising:
   an elongated container having a width and length, and which is easily compressed along its width dimension:
   a multiplicity of storage elements, each having a largely spherical shell which is fracturable and a fluid contained within the shell, said elements lying nested in one another within said container;
   squeezing and advancing means which includes a pair of jaws and means for progressively advancing said container along its length between said jaws to compress the container and fracture elements in said container which lie between said jaws, to release said fluid therein.

2. Apparatus for storing and releasing fluid comprising:
   a container having a width dimension, said container having a pair of flexible walls and being easily compressible along its width dimension by flexing said walls toward each other;
   a multiplicity of storage elements within said container each element including a fracturable shell containing a fluid to be stored; and
   means for compressing said container along its width to fracture said elements and release said fluid, including a pair of rollers separated by less than the width of said container when it contains said storage elements but by more than the thickness of said flexible walls, and means for rotating said rollers to move said container progressively between them and fracture said shells in the container.

3. A method for storing and retrieving a fluid, comprising:
   forming a multiplicity of shells of a shell material which is solid and rigid at room temperature, and which are each filled with at least one material to be stored which is fluid in the shells;
   filling a container, which has width and length dimensions and which is compressible along said width dimension, with said fluid-filled shells; and
   advancing said container progressively along its length between jaws while establishing said jaws at a separation which is narrow enough to fracture the shells which lie in each portion of said container as the portion moves between said jaws.

4. Apparatus for storing and releasing fluid comprising:
   an elongated container having a width and length, and which is easily compressed along its width dimension:
   a multiplicity of storage elements, each having a largely spherical shell which is fracturable and a fluid contained within the shell, said elements lying nested in one another within said container;
   squeezing and advancing means which includes a pair of jaws and means for progressively advancing said container along its length between said jaws to compress the container and fracture elements in said container which lie between said jaws, to release said fluid therein;
   said container includes a pair of walls, at least one of which is flexible, and which are pressed toward each other by said jaws; and
   said squeezing and advancing means includes means for holding said jaws a distance apart which is greater than the thickness of said pair of walls, whereby to permit release fluid to move between the jaws.

5. The apparatus described in claim 4 wherein:
   said container walls include a plurality of holes spaced along the length of the container and that are each smaller than said shells and through which said fluid can flow out as said shells are fractured.

6. A method for storing and retrieving a fluid, comprising:
   forming a multiplicity of shells of a shell material which is solid and rigid at room temperature, and which are each filled with at least one material to be stored which is fluid in the shells;
   filling a container, which has width and length dimensions and which is compressible along said width dimension, with said fluid-filled shells;
   feeding said container in a predetermined forward direction along its length between a pair of rollers while rotating said rollers and establishing them at a separation which is narrow enough to fracture the shells which lie in each portion of said container as the portion moves between said rollers; and
   emptying said fluid from said container at a location forward of said rollers.

7. The method described in claim 6 wherein:
   said container has a plurality of holes spaced along its length, and said step of emptying includes passing said fluid out through said holes from fractured shells as said shells are fractured.

* * * * *